(12) United States Patent
Kurniawan et al.

(10) Patent No.: US 10,803,427 B2
(45) Date of Patent: Oct. 13, 2020

(54) INTERFACES FOR RESOLVING MAINTENANCE ACTIVITIES

(71) Applicant: Honeywell International Inc., Morris Plains, NJ (US)

(72) Inventors: Andie Kurniawan, Mascot (AU); Kendall Paix, Cherrybrook (AU); Ashish Parmar, Rhodes (AU); Frank Lin, Oatlands (AU)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/249,519

(22) Filed: Jan. 16, 2019

(65) Prior Publication Data

US 2020/0226556 A1    Jul. 16, 2020

(51) Int. Cl.
| | | |
|---|---|---|
| *G08B 25/10* | (2006.01) | |
| *G06Q 10/00* | (2012.01) | |
| *H04W 4/024* | (2018.01) | |
| *H04W 4/33* | (2018.01) | |
| *G06Q 50/16* | (2012.01) | |
| *G08B 5/22* | (2006.01) | |
| *G06T 19/00* | (2011.01) | |
| *G08B 21/18* | (2006.01) | |

(52) U.S. Cl.
CPC ........... *G06Q 10/20* (2013.01); *G06Q 50/163* (2013.01); *G08B 5/222* (2013.01); *H04W 4/024* (2018.02); *H04W 4/33* (2018.02); *G06T 19/006* (2013.01); *G08B 21/187* (2013.01)

(58) Field of Classification Search
CPC ..... G06Q 10/20; G06Q 50/163; H04W 4/024; H04W 4/33; G08B 5/222; G08B 21/187; G06T 19/006
See application file for complete search history.

(56) References Cited

U.S. PATENT DOCUMENTS

| | | | |
|---|---|---|---|
| 2013/0169681 A1 | 7/2013 | Rasane et al. | |
| 2013/0218890 A1* | 8/2013 | Fernandes | G06F 16/27 |
| | | | 707/736 |
| 2014/0085335 A1* | 3/2014 | Chen | G09G 5/00 |
| | | | 345/633 |
| 2016/0140868 A1* | 5/2016 | Lovett | G09B 19/0053 |
| | | | 434/118 |
| 2016/0327293 A1 | 11/2016 | Grabowski et al. | |

(Continued)

OTHER PUBLICATIONS

Extended Search Report from related European Patent Application No. 20151317, dated Jun. 18, 2020, 9 pages.

*Primary Examiner* — Munear T Akki
(74) *Attorney, Agent, or Firm* — Brooks, Cameron & Huebsch, PLLC (57) ABSTRACT

Systems, methods, and devices for interfaces for resolving maintenance activities are described herein. For example, one or more embodiments include receiving an indication of a fault associated with an equipment item of a building, providing an interface via a display, wherein the interface includes a first portion configured to provide information associated with the fault based on the data, a second portion configured to provide navigation to the building, a third portion configured to provide navigation within the building to the equipment item, and a fourth portion configured to display an augmented reality visualization of the equipment item.

17 Claims, 6 Drawing Sheets

(56) References Cited

U.S. PATENT DOCUMENTS

| | | | |
|---|---|---|---|
| 2017/0243400 A1* | 8/2017 | Skidmore | G06F 3/011 |
| 2017/0321923 A1* | 11/2017 | Wiens-Kind | G05B 19/048 |
| 2017/0345283 A1* | 11/2017 | Kwon | G05B 23/0267 |
| 2019/0102488 A1* | 4/2019 | Santarone | G02B 27/0093 |
| 2019/0266793 A1* | 8/2019 | Sheffield | G06T 17/05 |

\* cited by examiner

INTERFACES FOR RESOLVING MAINTENANCE ACTIVITIES

TECHNICAL FIELD

The present disclosure relates to systems, devices, and methods for interfaces for resolving maintenance activities.

BACKGROUND

Maintenance personnel (e.g., technicians) routinely perform maintenance activities. These activities may be done as a matter of course and/or in response to specific requests. In some cases, maintenance personnel may be tasked with performing maintenance activities at multiple sites and/or in multiple buildings. These personnel may not be familiar with the systems and/or layout of all the different buildings. Moreover, information (e.g., information about buildings, systems, equipment items, etc.) may be needed from multiple sources in order to resolve a maintenance activity.

In previous approaches, maintenance personnel may spend time locating a building itself and potentially even more time pinpointing the specific locations of faulty equipment items therein. What is more, a lack of contextual information provided by previous approaches may necessitate that the equipment actually be physically inspected for diagnosis. Such delays can render previous approaches costly.

DETAILED DESCRIPTION

Systems, methods, and devices for interfaces for resolving maintenance activities are described herein. For example, one or more embodiments include receiving an indication of a fault associated with an equipment item of a building, providing an interface via a display, wherein the interface includes a first portion configured to provide information associated with the fault based on the data, a second portion configured to provide navigation to the building, a third portion configured to provide navigation within the building to the equipment item, and a fourth portion configured to display an augmented reality visualization of the equipment item.

As discussed herein, embodiments of the present disclosure can utilize data from connected buildings and other (e.g., third party) sources to provide a number of interfaces on a mobile device. Interfaces in accordance with embodiments herein can provide navigation to a building and/or navigation within a building to a location of faulty equipment.

Further, interfaces in accordance with embodiments herein can provide information associated with faulty equipment (e.g., name, model, type, installation date, etc.) and current (e.g., live and/or real-time) values of equipment operating parameters. In some embodiments, augmented reality can allow the viewing of this information and show faulty equipment that may be obscured, for instance.

The interfaces in accordance with embodiments of the present disclosure can provide information from disparate sources at-a-glance where previous approaches may involve the consultation and navigation of multiple sources (e.g., manuals, databases, navigation aids, maps, etc.). Accordingly, a mobile device employing a number of interfaces herein can streamline a number of maintenance activities, thereby saving time, cost, and frustration. As a result, building systems can be maintained such that their operation and performance is improved over previous approaches. In some embodiments, for instance, data from disparate sources can be combined into a single application that presents a number of interfaces relevant to a maintenance technician throughout a number of stages of maintenance activities.

As previously discussed, some embodiments of the present disclosure can provide an augmented reality to a user. In an example, a display associated with a mobile device can be viewed by a user. In some embodiments, the display can be built into a wearable device (e.g., a pair of glasses) and can display details associated with a building, an equipment item, a system, etc.

In the following detailed description of the present disclosure, reference is made to the accompanying drawings that form a part hereof, and in which is shown by way of illustration how one or more embodiments to of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. As will be appreciated, elements shown in the various embodiments herein can be added, exchanged, and/or eliminated so as to provide a number of additional embodiments of the present disclosure. As used herein, "a" or "a number of" refers to one or more. In addition, as will be appreciated, the proportion and the relative scale of the elements provided in the figures are intended to illustrate the embodiments of the present invention, and should not be taken in a limiting sense.

Figure 1:
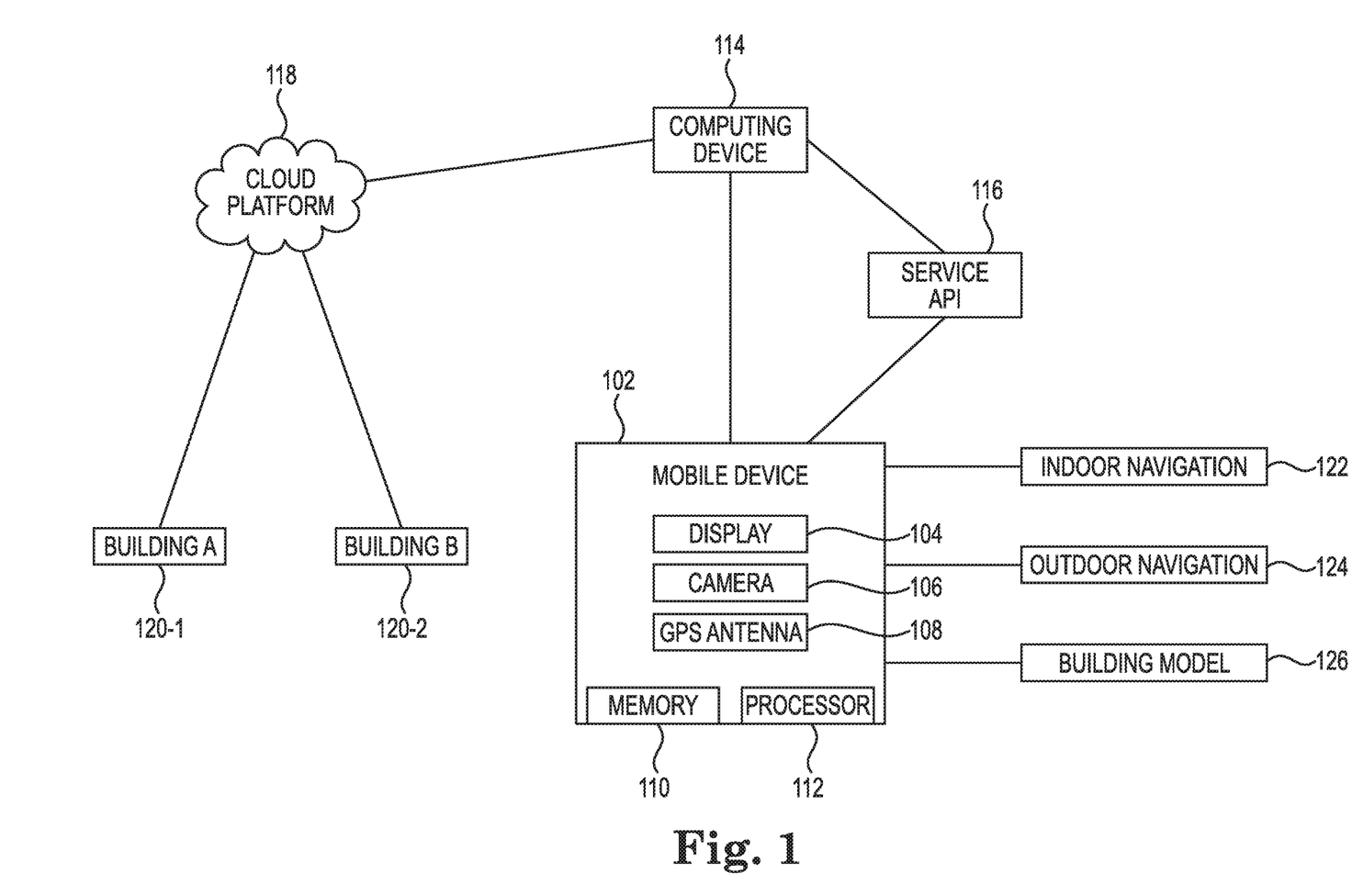
FIG. 1 illustrates a system for interfaces for resolving maintenance activities according to one or more embodiments of the present disclosure.

FIG. 1 illustrates a system for interfaces for resolving maintenance activities according to one or more embodiments of the present disclosure. The system can include a mobile device 102, a computing device 114, a service application programming interface (API) 116, a cloud platform 118, a first building ("Building A") 120-1, a second building ("Building B") 120-2 (sometimes cumulatively referred to herein as "buildings 120"), an indoor navigation source 122, an outdoor navigation source 124, and a building model source 126.

The mobile device 102 can be a computing device configured to be possessed, carried, and/or worn by a user. For instance, the mobile device 102 can be a mobile phone (e.g., a smartphone), a personal digital assistant (PDA), a wearable device, and/or a tablet, among other mobile devices. The mobile device 102 can include a graphical user interface (e.g., display 104). The display 104 can be configured to provide a number of interfaces in accordance with embodiments of the present disclosure. In some embodiments, the display 104 can present an augmented reality to a user of the mobile device 102. For instance, the display 104 can be a screen and/or transparent lens that is attached to the mobile device 102. For example, the mobile device 102 can be a pair of glasses and the display 104 can be incorporated into a lens of the glasses by projecting information onto the lens and/or by incorporating a screen into the lens.

In some embodiments, the mobile device can include a camera 106. In an example, the camera 106 can be used to capture images (e.g., of an equipment item and/or site surrounding an equipment item). For instance, the camera 106 can be used to capture images of an area and a two-dimensional (2-D) and/or three-dimensional (3-D) map can be constructed from the captured images. The constructed map can include walls, doorways, columns, and/or other obstructions, for example.

In some embodiments, the mobile device 102 can include a global positioning system (GPS) antenna 108. The GPS antenna 108 can be used to determine a position (e.g., GPS location) of the mobile device 102.

As shown in FIG. 1, the mobile device 102 includes a processor 112 and a memory 110 coupled to the processor 112. Memory 110 can be any type of storage medium that can be accessed by the processor 112 to perform various examples of the present disclosure. For example, memory 110 can be a non-transitory computer readable medium having computer readable instructions (e.g., computer program instructions) stored thereon that are executable by the processor 112 to perform aspects of one or more embodiments of the present disclosure. Though not shown in FIG. 1, additional elements of the system (e.g., computing device 114, cloud platform 118, etc.) can include a memory and a processor in a manner analogous to those of the mobile device 102.

Memory 110 can be volatile or nonvolatile memory. Memory 110 can also be removable (e.g., portable) memory, or non-removable (e.g., internal) memory. For example, memory 110 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 110 is illustrated as being located in the mobile device 102, embodiments of the present disclosure are not so limited. For example, memory 110 can also be located internal to another computing resource (e.g., enabling computer readable instructions to be downloaded over the Internet or another wired or wireless connection).

Processor 112 can execute the executable instructions stored in memory 110 in accordance with one or more embodiments of the present disclosure. For example, processor 112 can execute the executable instructions stored in memory 110 to receive an indication of a fault associated with an equipment item of one of the buildings 120 and provide an interface via the 104 display. As discussed further herein (e.g., in connection with FIGS. 2-6), the interface can include a number of different portions configured to provide helpful, contextually-relevant information to a user of the mobile device 102.

The computing device 114 can be configured to monitor the performance and/or operations of equipment (e.g., electrical and/or mechanical equipment). For instance, the computing device 114 can be and/or implement an outcome based service (OBS). "Equipment" as discussed herein refers to devices and/or components in a building. An equipment item may be a portion of a building system. For example, an equipment item may be a portion of a heating, ventilation, and air conditioning (HVAC) system, lighting system, security system, access control system, etc. Some example equipment items of an HVAC system include thermostats, controllers, air handling units (AHUs), variable air volume (VAV) devices, chillers, boilers, rooftop units, fans, fan coil units, etc.

The computing device 114 can monitor equipment performance (e.g., current and/or real-time performance) in line with key performance indicators (KPIs) tied to aspects of building comfort, energy efficiency, and/or equipment maintenance, for instance. Stated differently, the computing device 114 can receive current data describing operations of a plurality of building systems of the buildings 120. In some embodiments, actual equipment performance can be compared with desired (e.g., optimal) operational performance values to identify deviations (e.g., deviations exceeding a threshold). A deviation can cause the generation of a fault, which can be communicated to the mobile device 102 via the service API 116 as a service case. A fault can be generated that is associated with a particular equipment item of the one or more of the buildings 120.

The computing device 114 can receive historical equipment data from the cloud platform 118, which can be in communication with the buildings 120. The historical data can describe operations of a plurality of building systems of the buildings 120. The mobile device 102 can receive historical alarm information and/or current (e.g., live) values of equipment parameters from the cloud platform 118. An equipment parameter can refer to an operating parameter of an equipment item (e.g., temperature). An example of an equipment parameter value may refer to a current temperature associated with an air handling unit of 20 degrees Celsius.

The mobile device 102 can receive information from a number of additional sources. For instance, the mobile device 102 can receive indoor navigation information from the indoor navigation source 122; the mobile device can receive outdoor navigation information from the outdoor navigation source 124; and the mobile device can receive augmented reality data and/or building model data from the building model source 126. In some embodiments, one or more of the indoor navigation source 122, the outdoor navigation source 124, and the building model source 126 may be external (e.g., third party) entities.

Figure 2:
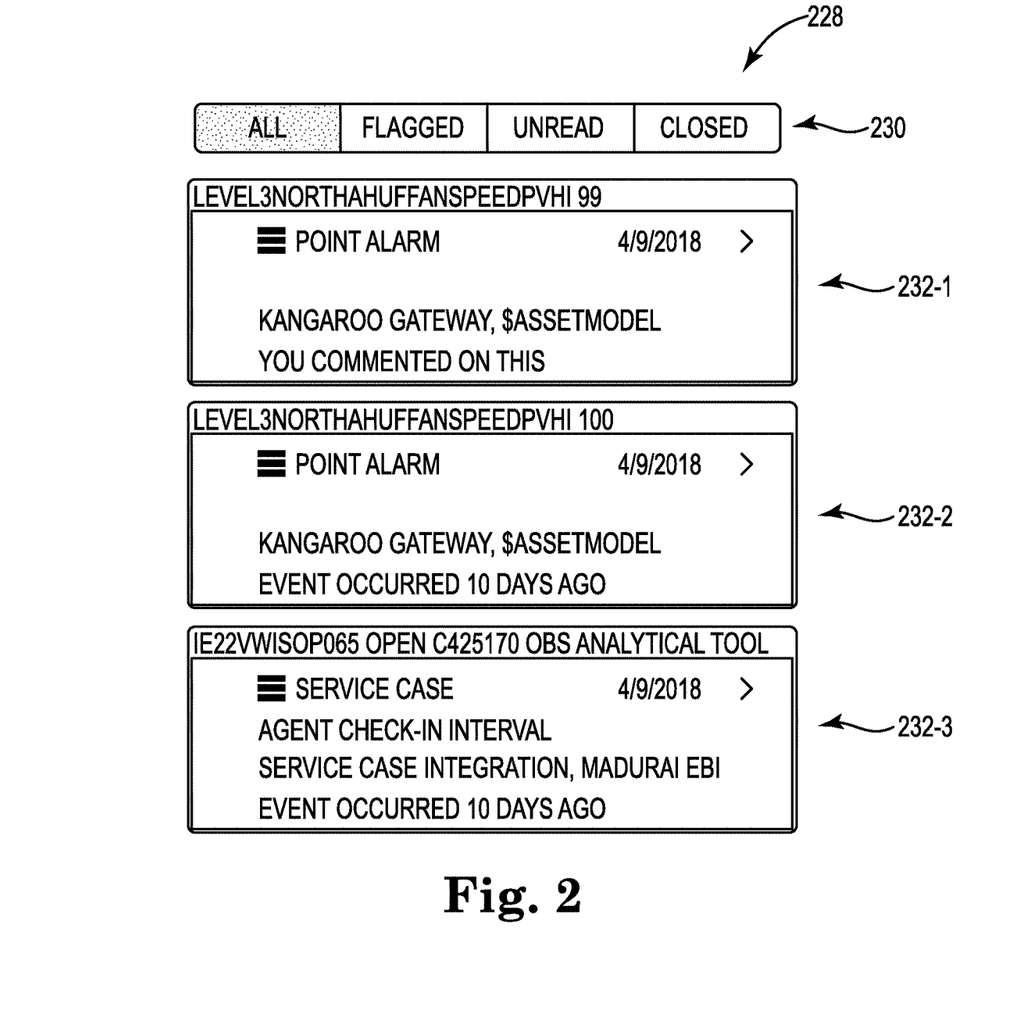
FIG. 2 illustrates a portion of an interface configured to display a plurality of indications associated with each of a plurality of faults according to the present disclosure.

FIG. 2 illustrates a portion of an interface configured to display a plurality of indications associated with each of a plurality of faults according to the present disclosure. The portion, referred to as "display 228" can be configured to show high level information regarding a plurality of faults and/or service cases. The display 228 includes a first indication 232-1, a second indication 232-2, and a third indication 232-3 (cumulatively referred to as "indications 232"). It is noted that while three indications are shown, embodiments of the present disclosure are not limited to a particular number of indications. Selection of one of the indications 232 can cause a different display to be provided that includes a greater level of detail regarding the selected item (described below in connection with FIG. 3).

The display 228 can include a navigation panel 230 including a plurality of selectable display elements causing different ones of the plurality of indications 232 to be displayed. The selectable display elements shown in FIG. 2 include "All," "Flagged," "Unread," and "Closed," though embodiments herein are not so limited. The display 228 can include information associated with each of the displayed indications. For instance, with reference to the indication 232-1, such information can include a type of the fault ("Point Alarm"), a date associated with the fault, an indication of a building corresponding to the fault ("Kangaroo Gateway") and additional information (e.g., an indication that the user of the mobile device commented on this particular fault).

Figure 3:
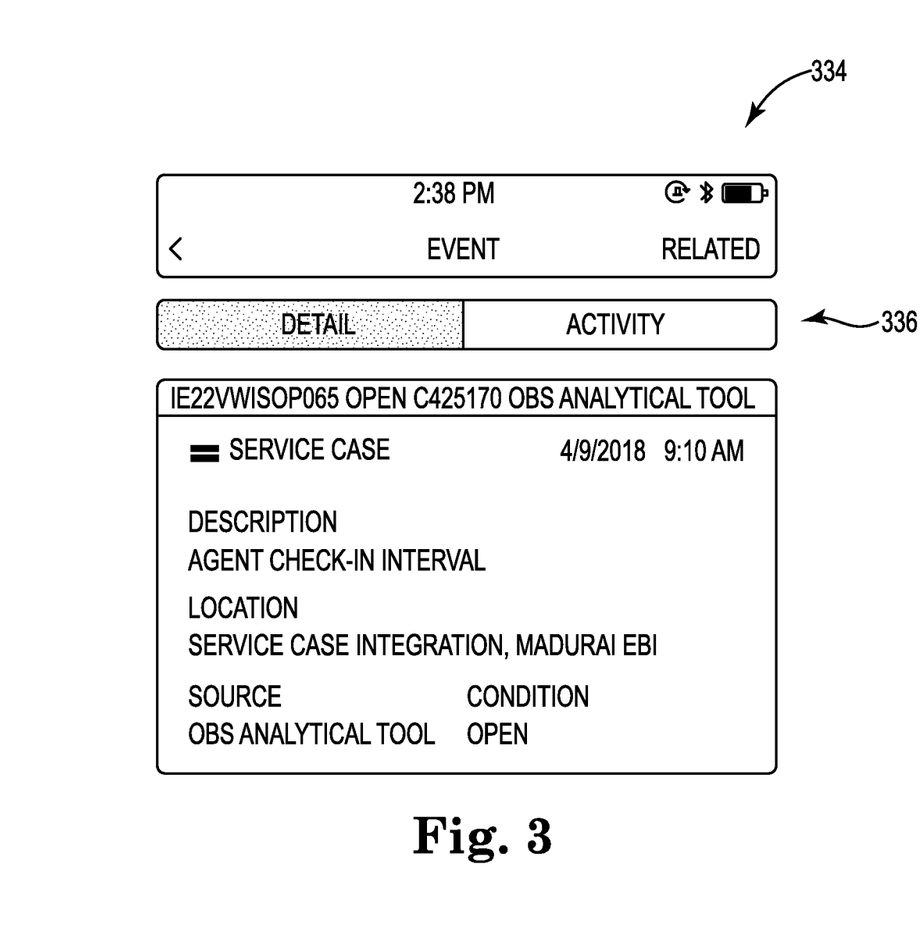
FIG. 3 illustrates another portion of an interface configured to provide information associated with a fault according to one or more embodiments of the present disclosure.

FIG. 3 illustrates another portion of an interface configured to provide information associated with a fault according to one or more embodiments of the present disclosure. In some embodiments, selection of a particular indication (e.g., the indication 232-3) from the display 228 can cause the provision of the portion illustrated in FIG. 3, which is alternately referred to herein as "display 334." The display 334 can be configured to show more detailed information regarding a single fault and/or service case. The display 334 can include a navigation panel 336 including a plurality of selectable display elements causing different information associated with the fault and/or service case to be displayed. The selectable display elements shown in FIG. 3 include "Detail" and "Activity," though embodiments herein are not so limited. Selection of the "Activity" display element can cause information to be displayed that corresponds to maintenance activity already performed responsive to the fault and/or service case. Selection of the "Detail" display element can cause display of a description of the fault and/or service case, a location of the service case, a time associated with the fault and/or service case, a source of the fault and/or service case, a condition and/or resolution status (e.g., closed or open) of the fault and/or service case, and/or other information. In some embodiments, current operational values of the equipment item(s) associated with the fault and/or service case can be displayed. In an example, a current fan speed of an AHU can be displayed. In some embodiments, historical and/or expected operational values of the equipment item(s) can be displayed. In some embodiments, an indication of occupant comfort in an area of the building associated with the faulty equipment item can be displayed. Such occupant comfort can be determined based on user surveying, for instance, and may be obtained from a cloud platform, such as that previously discussed in connection with FIG. 1. In some embodiments, the display 334 can include a tool or set of tools recommended for resolving the fault and/or service case. Accordingly, a user provided with the display 334 can remotely identify and/or diagnose faults and prepare his time and resources accordingly.

In some embodiments, the display 334 (or a different display) can include a three-dimensional rendering of the building having the faulty equipment item. Thus, before even reaching the site, a user can browse and/or navigate the building remotely using virtual reality. In some embodiments, for instance, a "fly through" effect can allow the user to traverse the path to the equipment item. In some embodiments, the user can navigate through the rendering using one or more selectable display elements, for instance.

Figure 4:
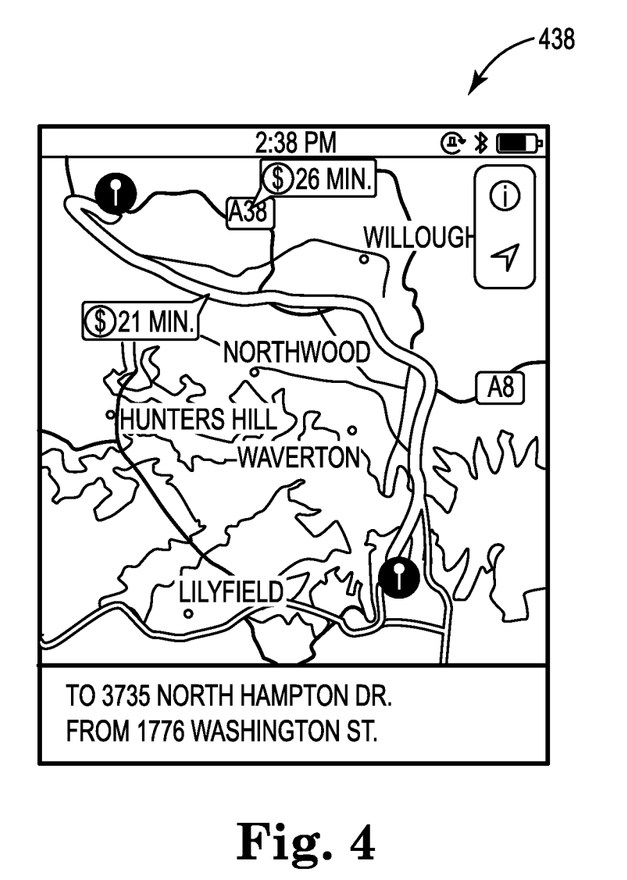
FIG. 4 illustrates another portion of an interface configured to provide navigation to a building according to one or more embodiments of the present disclosure.

FIG. 4 illustrates another portion of an interface configured to provide navigation to a building according to one or more embodiments of the present disclosure. The portion, referred to as "display 438" can be configured to show a map and/or turn-by-turn directions from a current location of the mobile device to the building having the equipment item associated with the fault and/or service case.

Figure 5:
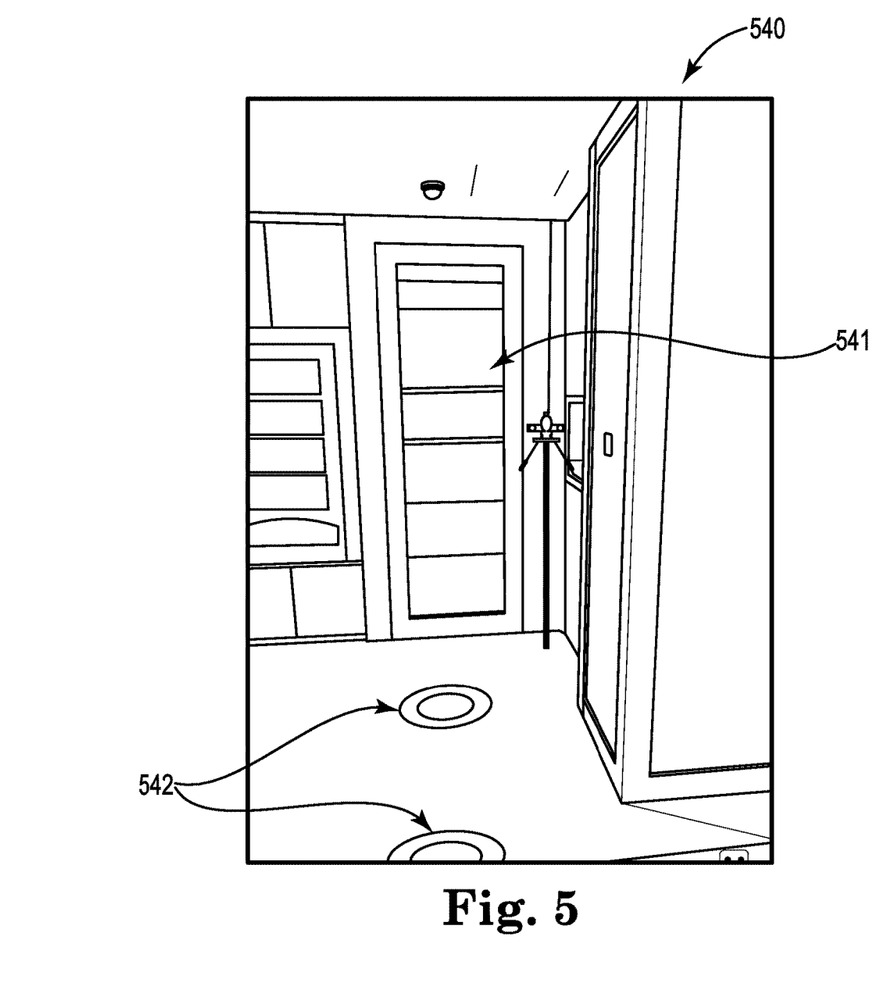
FIG. 5 illustrates another portion of an interface configured to provide navigation within a building to an equipment item according to one or more embodiments of the present disclosure.

FIG. 5 illustrates another portion of an interface configured to provide navigation within a building to an equipment item according to one or more embodiments of the present disclosure. The portion, referred to as "display 540" can be configured to show an augmented reality visualization providing a navigational path to an equipment item 541 associated with the fault and/or service case. The display 540 can be provided responsive to a user input, for instance, and/or responsive to a determination that the mobile device is located within and/or near the building. In some embodiments, a number of display elements (e.g., icon 542) can be placed on the display 540 of the mobile device. For example, the plurality of display elements can correspond to a navigational path within the building to the equipment item 541. Visualizing the building using the display, a user can follow the display elements to the equipment item 541, thereby saving time and hassle associated with manually locating the equipment item 541.

Figure 6:
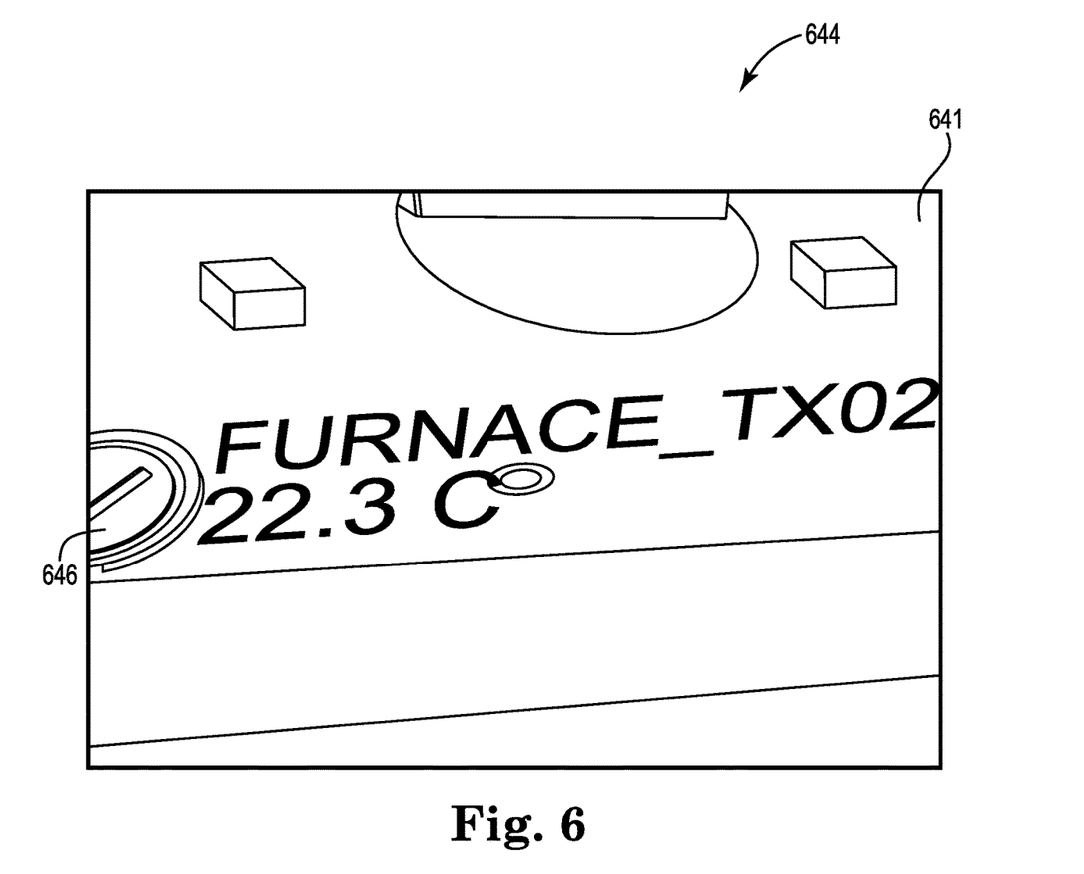
FIG. 6 illustrates another portion of an interface configured to display an augmented reality visualization of an equipment item according to one or more embodiments of the present disclosure.

FIG. 6 illustrates another portion of an interface configured to display an augmented reality visualization of an equipment item according to one or more embodiments of the present disclosure. The portion, referred to as "display 644" can be configured to show an augmented reality visualization of the equipment item 641 associated with the fault and/or service case. The display 644 can be provided responsive to a determination that the mobile device is located within a particular distance of the equipment item 641 and/or while a camera of the mobile device is being used to visualize the equipment item 641. The augmented reality of the display 644 can include a display element 646. The display element 646 can include information describing the equipment item 641 (e.g., name, identification number, item type, etc.). The display element 646 can include current data associated with the operation of the equipment item 641. As shown in the example illustrated in FIG. 6, the current operational data can include an output temperature of a furnace, for instance, though embodiments of the present disclosure are not so limited.

Using a number of the interfaces in accordance with embodiments herein, a user such as a maintenance technician can resolve a fault and/or service case associated with an equipment item. In some embodiments, resolution includes restoring the equipment item to a desired operating condition. In some embodiments, resolution includes replacing the equipment item (or a portion of the equipment item). In some embodiments, the user may indicate, using one or more of the interfaces discussed herein, that the fault and/or service case has been resolved. In some embodiments, the mobile device may receive updated operating information from the building and/or the equipment item indicating that the fault and/or service case has been resolved. Accordingly, an indication that the fault and/or service case has been resolved can include user input in some embodiments and may be provided automatically (e.g., without user input) in some embodiments.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A non-transitory machine-readable medium having instructions stored thereon which, when executed by a processor, cause the processor to:
   receive an indication of a fault associated with an equipment item of a building; and
   provide an interface via a display device, wherein the interface includes:
      a first display configured to provide information associated with the fault based on data associated with operations of a plurality of building systems of a building, wherein the information associated with the fault includes an indication of occupant comfort in an area of the building associated with the equipment item, the occupant comfort determined based on a survey of an occupant of the area;
      a second display configured to provide navigation to the building;
      a third display configured to display a three-dimensional rendering of the building, wherein the third display of the interface is configured to receive an input to navigate through a portion of the three-dimensional rendering of the building;
      a fourth display configured to provide navigation within the building to the equipment item; and
      a fifth display configured to display an augmented reality visualization of the equipment item.

2. The medium of claim 1, wherein the first display of the interface is configured to display a time associated with the fault.

3. The medium of claim 1, wherein the first display of the interface is configured to display a description of the fault.

4. The medium of claim 1, wherein the first display of the interface is configured to display a resolution status of the fault.

5. The medium of claim 1, wherein the information associated with the fault includes a current operational value of the equipment item.

6. The medium of claim 1, including instructions to provide an additional display of the interface configured to display a plurality of indications associated with each of a plurality of faults.

7. The medium of claim 6, wherein the additional display of the interface is configured to display a respective fault type of each of the plurality of faults.

8. The medium of claim 6, wherein the additional display of the interface is configured to display an indication associated with each of a first subset of the plurality of faults responsive to a selection of a display icon on the additional display of the interface.

9. The medium of claim 1, wherein the fourth display of the interface is configured to display a plurality of display elements in an augmented reality visualization, and wherein the plurality of display elements correspond to a navigational path within the building to the equipment item.

10. A system for resolving maintenance activities, comprising:
    a computing device, configured to:
       receive data associated with operations of a plurality of building systems of a building; and
       generate a fault associated with an equipment item of the building;
    a user device configured to receive an indication of the fault and provide an interface, wherein the interface includes:
       a first display configured to provide information associated with the fault based on the data, wherein the information associated with the fault includes an indication of occupant comfort in an area of the building associated with the equipment item, the occupant comfort determined based on a survey of an occupant of the area;
       a second display configured to provide navigation to the building;
       a third display configured to display a three-dimensional rendering of the building, wherein the third display of the interface is configured to receive an input to navigate through a portion of the three-dimensional rendering of the building
       a fourth display configured to provide navigation within the building to the equipment item; and
       a fifth display configured to display an augmented reality visualization of the equipment item.

11. The system of claim 10, wherein the computing device is configured to receive historical data and current data associated with operations of the plurality of building systems of the building.

12. The system of claim 10, wherein the computing device is configured to generate the fault associated with the equipment item of the building responsive to a determination that a value of an operating parameter of the equipment item exceeds a threshold.

13. The system of claim 10, wherein the equipment item is a component of a heating, ventilation, and air conditioning (HVAC) system.

14. The system of claim 13, wherein the equipment item is one of: an air handling unit, a variable air volume device, a rooftop unit, and a fan.

15. A method for resolving maintenance activities, comprising:
    receiving historical data describing operations of a plurality of building systems of a plurality of buildings;
    receiving current data describing operations of the plurality of building systems of the plurality of buildings;
    generating a fault associated with a particular equipment item of one of the plurality of buildings;
    communicating an indication of the fault in a service case to an interface of a mobile device associated with a maintenance technician, wherein communicating the indication of the fault in the service case includes indicating occupant comfort in an area of the one of the plurality of buildings, the occupant comfort determined based on a survey of an occupant of the area wherein the interface is configured to display a three-dimensional rendering of the one of the plurality of buildings, and wherein the interface is configured to receive an input to navigate through a portion of the three-dimensional rendering of the one of the plurality of buildings; and communicating an indication of a resolution of the service case to the interface.

16. The method of claim 15, wherein communicating the indication of the fault in the service case includes indicating a particular building of the plurality of buildings in which the particular equipment item is located.

17. The method of claim 15, wherein communicating the indication of the fault in the service case includes providing an indication of a tool recommended for resolving the service case.

\* \* \* \* \*